United States Patent [19]

Merle

[11] Patent Number: 4,624,399
[45] Date of Patent: Nov. 25, 1986

[54] GRIPPING DRIVE FOR MAGNETIC TAPE
[75] Inventor: Jean-Pierre Merle, Clamart, France
[73] Assignee: Enertec, Montrouge, France
[21] Appl. No.: 713,717
[22] Filed: Mar. 19, 1985
[30] Foreign Application Priority Data
  Mar. 19, 1984 [FR] France .................. 84 04197
[51] Int. Cl.⁴ .......................................... B65H 20/02
[52] U.S. Cl. ......................... 226/181; 226/183;
                                  226/187; 242/197; 242/209
[58] Field of Search .............. 226/181, 183, 186, 187,
          226/188, 179, 180; 242/192, 206, 209, 210, 197

[56] References Cited
U.S. PATENT DOCUMENTS

| 2,373,107 | 4/1945 | Duffy ..................... 226/187 |
| 2,499,699 | 3/1950 | Tinkham ................. 226/183 |
| 2,858,130 | 10/1958 | Baur et al. ............. 226/183 |
| 2,990,092 | 6/1961 | Begun et al. ........... 226/187 X |
| 2,998,906 | 9/1961 | Vice et al. ............. 226/187 |
| 3,402,868 | 9/1968 | Hammond ............. 226/187 |
| 3,604,606 | 9/1971 | Marino et al. . |
| 3,630,426 | 12/1971 | Rieger ................... 226/183 X |
| 3,692,255 | 9/1972 | Von Bahren . |
| 3,877,627 | 4/1975 | Boase et al. . |
| 3,907,230 | 9/1975 | Merle et al. ........... 242/192 |
| 3,938,752 | 2/1976 | Mann et al. ............ 226/183 X |

FOREIGN PATENT DOCUMENTS

| 001467 | 5/1980 | European Pat. Off. . |
| 0089865 | 9/1983 | European Pat. Off. . |
| 723995 | 8/1942 | Fed. Rep. of Germany . |
| 872660 | 4/1953 | Fed. Rep. of Germany . |
| 1128676 | 4/1982 | Fed. Rep. of Germany . |
| 1067319 | 6/1954 | France . |
| 352505 | 4/1961 | Switzerland ............ 226/187 |

Primary Examiner—Stanley N. Gilreath
Attorney, Agent, or Firm—Dale Gaudier

[57] ABSTRACT

Tape drive apparatus having a drive roller 1 and pinch roller 2 including a idler roller 3 around which tape 4 passes. The pinch roller 2 which is rotatable about two normal axes (A2 and A4), is resiliently urged against the drive roller 1 and the idler roller 3, the two rollers being spaced apart from each other. This apparatus is particularly useful for magnetic tape cassettes, the pinch roller 2 being formed as either part of the cassette or as part of a tape recorder/player for using a cassette.

8 Claims, 4 Drawing Figures

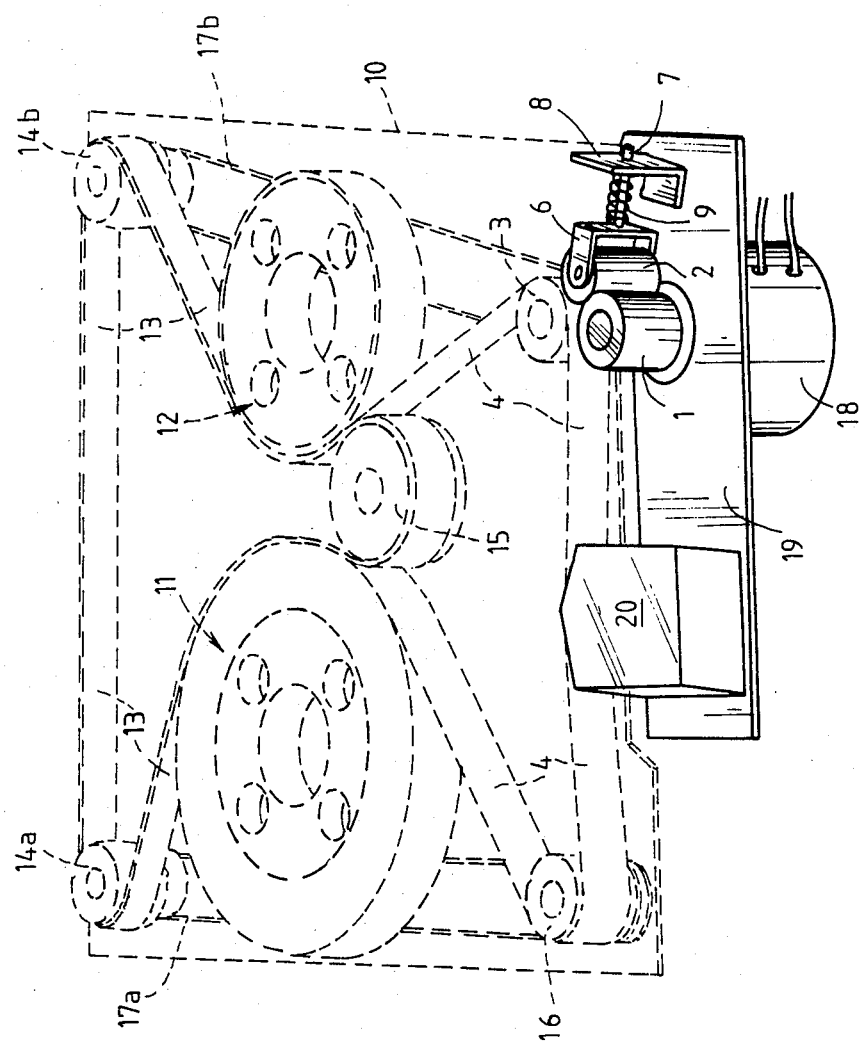

GRIPPING DRIVE FOR MAGNETIC TAPE

BACKGROUND OF THE INVENTION

The present invention concerns a drive apparatus for a magnetic tape gripped between two rollers, simultaneous rotation of which provides the drive for said tape, the apparatus including a drive roller rotatable about a first axis and providing the energy required for driving the tape, and a pinch roller, rotatable about a second axis substantially parallel to the first and ensuring grip of the tape.

Such gripping drive apparatus for tape are well known in the field of magnetic recording. An example of such is given in U.S. Pat. Nos. 3,907,230 by the same inventor.

These known apparatus, in which the tape is gripped directly between the drive roller and the pinch roller, present a problem which, although without serious consequences in normal use, can be very troublesome in special applications.

More particularly, when the passage of the tape involves frequent forward and reverse shuttle movements or stops and starts, the tape is subject to deflections in height on the pinch roller, that is to say it rises or falls according to the direction of rotation of the roller.

At normal temperatures, the deflection in height may be relatively small, for example of the order of a tenth of a millimeter.

Nevertheless, the deflection increases when the temperature falls, to the point of reaching typically six tenths of a millimeter at $-40°$ C.

When the deflections reach such levels, which are no longer at all negligible in comparison with the width of the recording tracks corresponding to data recorded on the tape, the result is, in reading the data, a weakening of the output signals which is at least inconvenient, and occasionally even unacceptable.

Against this background, an object of the present invention is to provide a magnetic tape drive only introducing a negligible tape deflection, even when used in a shuttle regime and at relatively low temperatures, of the order of $-40°$ C.

SUMMARY OF THE INVENTION

To this end, the apparatus of the invention is characterized in that it comprises, in addition to a drive roller for driving the tape and a pinch roller which grips it, an idler roller around which the tape passes, spaced apart from the drive roller and rotatable about a third axis substantially parallel to the previous two, and in that the pinch roller is resiliently urged simultaneously against both the tape passing around the idler roller and against the drive roller, and is rotatable about a fourth axis substantially normal to the second axis and substantially parallel to the direction along which the pinch roller is urged.

Preferably, the fourth axis, around which the pinch roller is rotatable, is substantially normal to the plane containing the first and third axes.

Advantageously, it may be arranged that the tape encircles the idler roller through a wrapped angle at least equal to 90°.

In order that the pinch roller impinges correctly on the drive and idler rollers, the pinch roller is preferably provided with a capability to move a relatively large amount in a direction parallel to the plane containing the first and third axes.

Moreover, this effect is most easily attained if the angle of the apex at the second axis which is formed by the first, second and third axes in a plane normal thereto is at least equal to 60°.

The coefficient of friction between the surface of the idler roller and the tape is advantageously increased, such as that given for example by a ground metal surface.

The invention is particularly suitable to be used driving magnetic tapes on which data is recorded and/or read in a shuttle or stop-start regime.

The pinch roller may be formed as part of the cassette itself or integrated with the tape recorder/player with which the cassette is intended to be used.

BRIEF DESCRIPTION OF THE DRAWINGS FIGURES

Other features and advantages of the invention will be apparent from the following description, given by way of non limitative example, with reference to the accompanying diagrammatic drawings, of which, FIG. 1 is a perspective view of known tape drive apparatus having a pinch roller and a drive roller;

FIG. 4 is a view of the same apparatus arranged for a cassette, the pinch roller being part of the tape recorder/player with which the cassette is intended to be used.

DETAILED DESCRIPTION OF THE PREFERRED EMBODIMENTS

Figure 1:
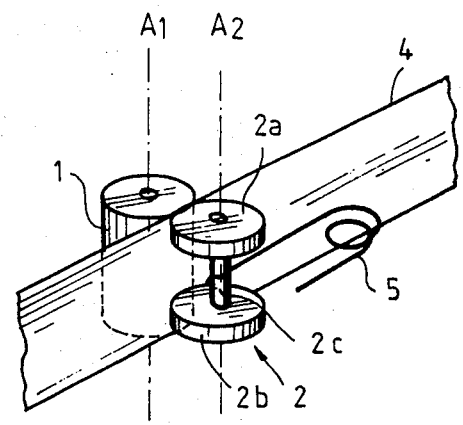

The principle employed in the prior art is represented in FIG. 1.

Known tape drive apparatus comprises a drive roller 1 rotatable about a first axis A1 and pinch roller 2 rotatable about a second axis A2 substantially parallel to the first axis A1.

Magnetic tape 4 is gripped between the drive roller 1 and pinch roller 2 without in practice encircling either roller.

The pinch roller 2 is for example made up of two discs 2a, 2b connected by a shaft 2c on which resiliently impinges a hair spring 5.

The force exerted by the spring 5 is transmitted through the agency of the pinch roller 2 to the tape 4, which is thereby urged against the drive roller 1. Under these conditions, rotation of the drive roller 1 results in simultaneous rotation of the pinch roller 2 and longitudinal drive of the tape.

Such a known drive arrangement presents the problem already described that the tape 4 deflects in height on the roller 2 when it is subjected to shuttle movement, particularly at low temperature.

Figure 2:
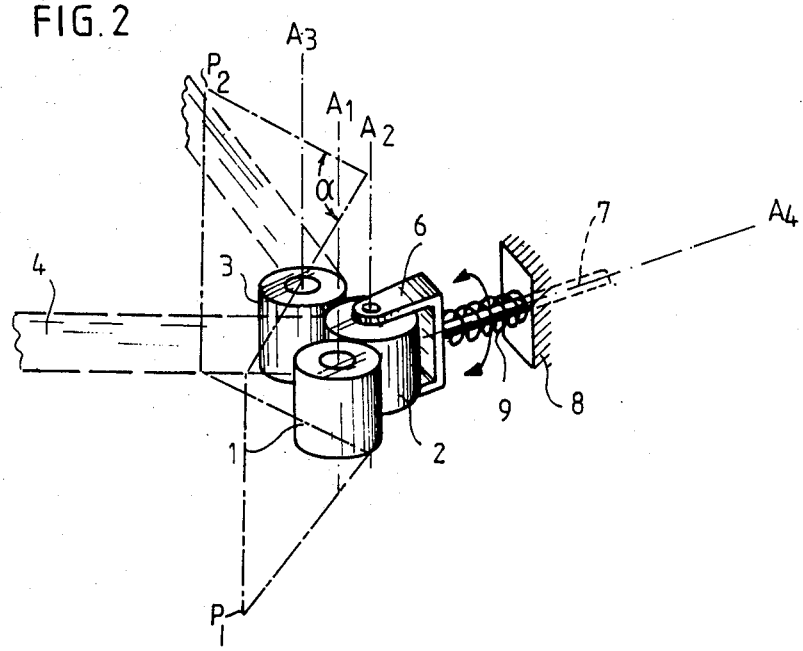
FIG. 2 is a perspective view of tape drive apparatus in accordance with the invention.

Apparatus in accordance with the invention, which overcomes this problem, is shown in FIG. 2 in which parts similar to parts shown in FIG. 1 are marked by the same reference numerals.

As with known apparatus, apparatus in accordance with the present invention comprises a drive roller 1 rotatable about an axis A1 and a pinch roller 2 rotatable about an axis A2 substantially parallel to the axis A1.

However, in contrast to the known arrangement, the tape 4 is not gripped between the drive roller 1 and pinch roller 2, but partially encircles an idler roller 3 rotatable about an axis A3 substantially parallel to both the other axes A1 and A2. The wrapped angle of tape 4 around the idler roller 3 is as large as possible and is for example equal to or greater than 90°.

The pinch roller 2 is simultaneously resiliently urged against both the drive roller 1 and the idler roller 3, the drive roller and idler roller being spaced apart from each other.

In this way, the tape 4 is interposed and gripped between the pinch roller 2 and the idler roller 3 and the impetus, provided by the drive roller 1, is transmitted by the pinch roller 2 to idler roller 3 and to the tape 4. As far as the tape 4 is concerned the pinch roller acts as a driver, in contrast to the case of the prior art.

In accordance with the invention, the pinch roller is rotatable not only about the axis A2, but also about an axis A4 substantially normal to the axis A2 and the plane containing the axes A1 and A3 of the drive roller and idler roller.

Moreover, the axis A4 preferably defines the direction in which the pinch roller 2 is urged towards the rollers 1 and 3.

Strictly, the pinch roller 2 should be urged in a direction which allows it to be tangential with both the drive roller and the idler roller; nevertheless this direction is approximately provided by the line of equidistance between the projection of the axes A1 and A2 in a plane perpendicular thereto, when the drive roller 1 and idler roller 3 have substantially the same radius.

For example, the pinch roller 2 is rotatable in a yoke 6 supported by a perpendicular shaft 7 pivoting in a support member 8, and a coil spring 9 urges the yoke 6 away from the support member 8 towards the rollers 1 and 3.

In order that the pinch roller is able to impinge correctly on the drive roller 1 and idler roller 3, the angle α between a first plane P1 containing axes A1 and A2, and a second plane P2 containing axes A2 and A3 is preferably equal to at least 60° and the shaft 7 slides in the support 8 with a predetermined play, such as to allow axis A2, if necessary, to move toward and away from axes A1 and A3.

In other words, the pinch roller 2 is capable of displacement in a direction normal to a plane containing axes A1 and A3.

Although it is difficult to give a minimum value for this displacement, it may be at least equal to the play that is required to take up irregularities of the rollers and of their expansion and contraction as a function of temperature.

Preferably, the pinch roller 2 is formed as a complete cylinder rather than of two discs and is made up of a metal roller covered by a layer of rubber of between 2 and 3 tenths of a millimeter in thickness.

The outer surface of idler roller 3 is formed with a roughened surface of ground metal or metal alloy, such as steel, to provide good frictional characteristics between the idler roller and the tape The drive roller 1 may be itself formed by a metal roller covered by a thin layer of rubber, similar to the pinch roller.

Figure 3:
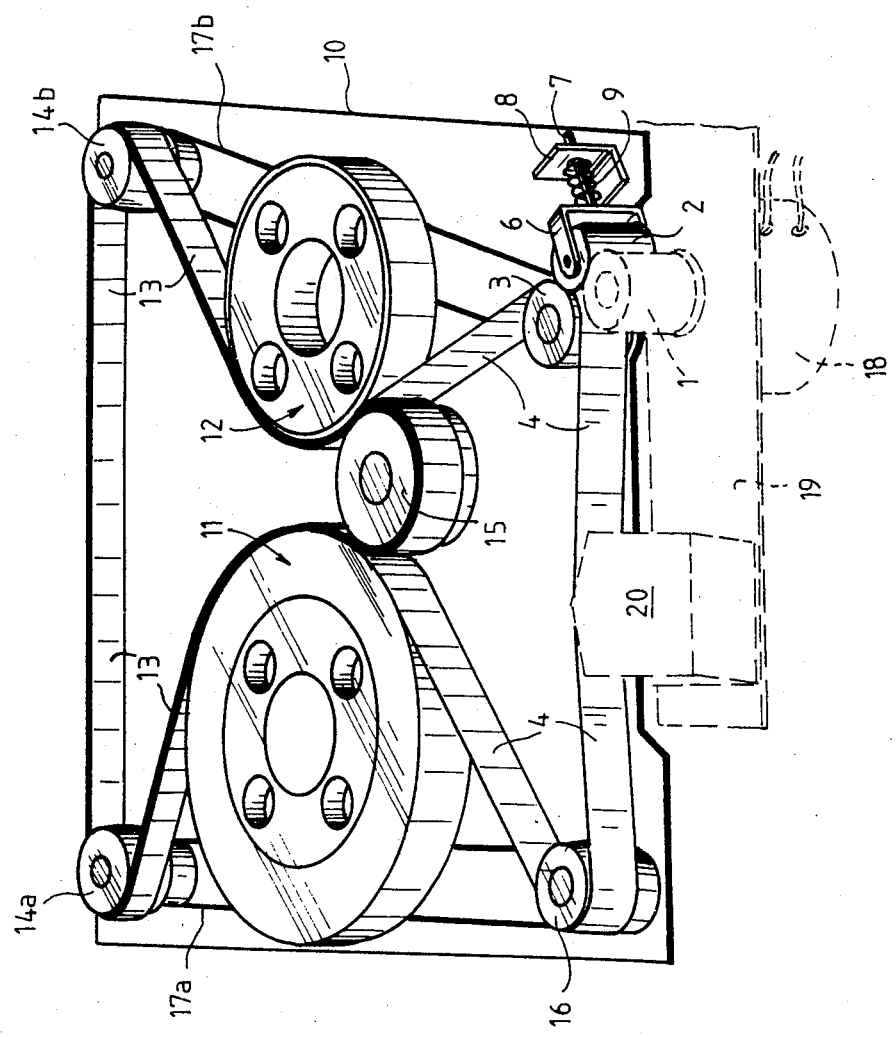
FIG. 3 is a view of the same apparatus arranged for a cassette, the pinch roller being part of the cassette.

FIG. 3 represents a cassette in which there is embodied the apparatus of the invention.

Apart from the arrangement of the present invention, such a cassette will be known to one skilled in the art, amongst others see European Patent EP0 No. 089 865 A1, so that a detailed description of the cassette is not called for.

The cassette comprises a base plate 10 on which are mounted two spools 11, 12, which, respectively pay out and take up the magnetic tape 4.

These spools are synchronized by means of an elastic belt 13 passing around pulleys 14a, 14b and around a floating roller 15 arranged to maintain the belt in co-operation with the spools.

The magnetic tape passes around two further pulleys 16, 3 of which one, 3, is the idler roller which forms a part of the drive system of the invention.

The pulleys 14a and 16 on the one hand and 14b and 3 on the other may be synchronized by means of round belts 17a and 17b, in accordance with the teaching of the European Patent mentioned above.

The pinch roller 2 is, together with its yolk 6, shaft 7 and the spring 9, mounted on a support 8 secured to the base plate 10 whereas the drive roller 1, secured to a drive motor 18 is mounted on the base plate 19 of a tape recorder/player with which a cassette in accordance with the invention is intended to be used. This apparatus comprises at least a data recording and/or playback head 20 for example secured to the base plate 19 as shown in FIG. 3.

FIG. 4 represents exactly the same components as FIG. 3, identified by common references.

The only difference between FIGS. 3 and 4 is that the latter shows a case in which the pinch roller 2 is not part of the cassette, but of the tape recorder using it.

As may be seen in FIG. 4, the support 8 is no longer secured to the base plate 10 of the cassette, but to the base plate 19 of the tape recorder, which also supports the motor 18, the drive roller 1 and the head 20.

In comparison with FIG. 3, the arrangement of the drive roller 1 and the idler roller 3 is also modified in FIG. 4 so that the pinch roller 2 is resiliently urged against the drive roller 1 and idler roller 3 along such a direction that it provides substantially the same force on each of the two rollers 1 and 3.

By virtue of the arrangement described, the deflection in height of the tape is able to be maintained at a very low value, which may be quantified as three or four hundredths of a millimeter at −40° C.

Although the invention has been described with reference to FIGS. 3 and 4, for a specialized type of cassette, it will be understood that the invention is among other things useful in all cases where the drive system of FIG. 1 or similar systems had been utilized in the past.

What is claimed is:

1. Apparatus for driving a magnetic tape, comprising:
   a drive roller rotatable about a fixed first axis for providing drive for the tape;
   a pinch roller rotatable about a second axis;
   a idler roller around which the tape passes, said idler roller being spaced apart from said drive roller and rotatable about a fixed third axis substantially parallel to the first axis; and
   pinch roller mounting means for urging said pinch roller along a direction such that said pinch roller simultaneously impinges against both the tape passing around said idler roller and said drive roller such that said second axis is substantially parallel with said first and third axes, said pinch roller mounting means being rotatable about a fourth axis substantially perpendicular to the second axis and substantially parallel to the direction along which the pinch roller is urged.

2. The apparatus of claim 1 wherein the fourth axis is substantially normal to a plane containing the first and third axes.

3. The apparatus of claim 1 wherein the tape is wrapped around the idler roller through an angle of at least 90°.

4. The apparatus of claim 1 wherein the pinch roller is movable along a direction normal to a plane containing the first and third axes.

5. The apparatus of claim 1 wherein the drive, idler and pinch rollers are arranged such that a first plane containing the first and second axes intersects with a second plane containing said second and third axes at an angle of at least 60°.

6. The apparatus of claim 1 wherein at least the surface of the idler roller is formed from a ground metal having a roughened surface.

7. The apparatus of claim 1 further including a tape cassette containing said tape, said tape cassette cooperating with said tape drive apparatus and wherein the pinch roller is formed as part of the cassette.

8. The apparatus of claim 1 further including a tape recorder/player cooperating with said tape drive apparatus and wherein the pinch roller is formed as part of said recorder/player.

* * * * *